Patented Apr. 20, 1943

2,316,810

UNITED STATES PATENT OFFICE 2,316,810

METHOD OF AND MATERIAL FOR COATING METAL SURFACES WITH WATER INSOLUBLE METALLIC PHOSPHATES

Gerald C. Romig, Melrose Park, Pa., assignor to American Chemical Paint Company, Ambler, Pa., a corporation of Delaware No Drawing. Application April 10, 1940, Serial No. 328,899

4 Claims. (Cl. 148—6)

This invention relates to the art of coating metal surfaces with a water-insoluble metallic phosphate and is particularly concerned with an improved method of treatment as well as with the material for use in the treatment.

The principal object of the invention is to provide a phosphate coating solution which has a much greater degree of stability than do coating solutions now commonly in use. A further object is to provide materials for use in the preparation and replenishment of my improved coating solutions which, by simple dilution with water, or addition to existing coating solutions, will result in the production of coating solutions having the desired increase in stability.

Before proceeding further with a description of the present invention I wish to define the term "stability" as employed herein. The term as I use it refers to the degree to which an acid phosphate solution of the character herein described resists spontaneous disturbance of its state of acidity (or its pH). As is well known in this art, phosphate coating solutions have a tendency to increase in acidity, especially when permitted to stand idle for any length of time. In phosphate coating processes which employ supersaturated acid phosphate coating solutions such an increase in acidity is brought about by virtue of a loss in supersaturation or by what is commonly, though probably somewhat incorrectly, spoken of as "hydrolysis."

It was discovered very early in the art of phosphate coating that solutions comprising dihydrogen phosphate were superior to solutions of phosphoric acid alone, and later that even in these dihydrogen phosphate solutions it was advantageous to reduce the content of free phosphoric acid to the lowest practical degree in order to secure coatings in the shortest possible space of time and with the least etching or "pickling" of the metal to be coated.

It has long been the practice to maintain the coating solutions saturated or nearly saturated with respect to the insoluble phosphate in equilibrium with the liquid. This requires that the solution contain a certain minimum quantity of free acid. If the free acid is reduced at this point, the solutions become supersaturated and there is precipitated from them, at a finite rate, a solid phase of a lower phosphate : metal ratio than that of the solution itself. This precipitation (actually a mere crystallization of an insoluble constituent from a supersaturated solution) has been commonly called "hydrolysis," apparently because of its analogy with the precipitation of a basic salt from a neutral salt solution by hydrolysis—as, for example, the precipitation of a basic ferric sulphate from a neutral ferric sulphate solution or the precipitation of ferric hydroxide from a ferric chloride solution, particularly on heating, with the appearance in the solutions of a certain amount of free acid. Like the process of true hydrolysis, the process of crystallization from a supersaturated phosphate solution increases with a rise in temperature. This is due to the fact that the solid phase becomes less soluble in the solution as the temperature is raised, and probably not to true hydrolysis.

Nevertheless, whatever the cause may be, the precipitation of insoluble phosphates with the accompanying increase in free acid of the solution, commonly known as "hydrolysis," leads to difficulties in the operation of a phosphate coating process. Generally speaking, phosphate coatings form on metals because some of the free acid of the solution is removed by reaction of the solution with the metal itself with the local production at the surface of the metal of a layer of highly supersaturated solution which then deposits a phosphate layer upon the metal. Since this is so, the speed of a phosphate coating process, obviously, is profoundly affected by the amount of free acid which must be consumed by the metal to bring the local supersaturation to the point at which the deposition of the phosphate will be as rapid as is necessary to complete the coating in the time allowed. Such an undesired gain in free acid due to "hydrolysis" may occur in practice by the accidental heating of the solution above the normal operating temperature and the subsequent reestablishment of the normal temperature. During the period of overheating the solution precipitates insoluble phosphate and becomes more acid.

It has been discovered that phosphate coating solutions under certain conditions behave best and coat most rapidly when they are maintained in a supersaturated condition. However, a supersaturated solution continually and spontaneously tends to deposit metal phosphate and simultaneously tends to become more acid, i. e., to fall in pH. Certain expedients have heretofore been adopted to maintain such solutions in their supersaturated condition during the commercial production of phosphate coatings, but the cost of such operation naturally increases with the rate of "hydrolysis."

The invention of the present disclosure relates to the discovery that the rate of loss of supersaturation or "hydrolysis" may be very much reduced by having present, in addition to the normal ingredients of a phosphate coating solution, a small proportion of certain ions which I have found will function to inhibit or retard such loss of supersaturation or "hydrolysis." My invention makes possible the attainment of certain other objectives, namely, the provision of a phosphate coating process which is far less critical in operation than processes heretofore known to the art, the provision of a process which results in more uniformity in the quality of the finished work, and the provision of a process in which the cost of supervision and of the correction of solutions to keep them in their most satisfactory operating condition is much reduced.

I will now describe the principles of my invention in connection with zinc phosphate coating solutions which have become increasingly common in present day practice.

I accomplish my improved results by adding to an acid zinc phosphate coating solution or to materials or concentrated solutions for use in preparing such a coating solution, small amounts of compounds of metals which are capable of yielding certain ions in the coating solution in an amount sufficient to substantially prevent or markedly retard loss of supersaturation or "hydrolysis." Among the metal compounds which I have found to have the desired effect are those which yield in the coating solution, ferric ions, aluminum ions, chromic ions, stannous ions and antimonious ions. The quantity of inhibiting ions which it is necessary to employ to retard "hydrolysis" to a practical degree is ordinarily very small. From approximately .005% to approximately .02% of inhibiting ion in the bath is generally sufficient. In general, it may be said that a maximum of .1% in the coating bath is sufficient to produce the maximum effect, although more than this quantity is not necessarily objectionable. In this connection, however, it should be noted that the ions have a limited solubility in the baths because their phosphates are not very soluble. For instance, the ferric, aluminum and chromic ions are only slightly soluble in dilute phosphate solutions so that their concentration can be only very low. Antimonious compounds are probably present as antimonyl ions, but they, too, are only slightly soluble in the dilute coating solutions. Therefore, it would not pay to add to the bath soluble compounds of the ions in question in such quantities that much of the desired ion would be precipitated while other substances formed by the reaction might remain in solution. For example, if there be added to a zinc phosphate bath a considerable amount of ferric sulphate, ferric phosphate will be formed and also zinc sulphate. Only a small amount of the ferric phosphate would remain dissolved and the remainder would be uselessly precipitated. This naturally would result in a loss from the solution of valuable phosphate with the introduction into the solution of worthless sulphate. Except for considerations of this kind, there does not seem to be any reason to put a definite upper limit on the quantity of inhibiting ions to employ.

The form in which the ion is added to the bath is of no particular consequence per se. Any compound of the inhibiting metal capable of giving the appropriate ion in the coating solution is satisfactory. For instance, ferric ion may be added as phosphate (in acid solution), sulphate, chloride, etc.; antimony may be added as tartar emetic, as antimony trichloride, etc.; aluminum may be added as acetate or chloride, etc. Of course, no substance should be added which interferes with the action of the coating bath itself. In practice, however, so little of the inhibiting ion is used that the associated anions, for instance, have little or no effect.

It is to be noted that ferric iron and aluminum produce no noticeable effect upon the quality of the coating produced. Antimony has a slight retarding effect on the speed of rapid coating processes. In processes involving boiling of the solutions, it has little effect on the speed of coating. Being electronegative to iron and zinc, for example, antimony deposits upon these metals in metallic form while they are being phosphate coated. The deposited antimony darkens the coatings produced, and antimony is simultaneously lost from the solution. The "hydrolysis-inhibiting" effect of antimony is thus soon lost on processing work.

Stannous tin likewise has a retarding effect upon phosphate coating processes and caution must be used in employing it in these solutions. However, where the retardation in coating occasioned by its presence is not important, it may be used as a hydrolysis inhibitor.

Outside of these limitations, however, the kind and quantity of inhibiting ion which may be used in my novel coating solutions and compositions for their preparation or replenishment are not at all critical, within the limits above set forth.

Examples of materials useful in the preparation and replenishment of phosphate coating solutions are given below:

*Formula No. 1*

| | | |
|---|---|---|
| Zinc oxide | pounds | 1.667 |
| Phosphoric acid, 75% | gallons | 0.500 |
| Water | do | 0.500 |
| Ferric chloride hexahydrate | pounds | 0.060 |

*Formula No. 2*

| | Pounds |
|---|---|
| Zinc dihydrogen phosphate, crystallized | 0.98 |
| Aluminum sulphate, nonahydrate | 0.02 |

The above materials are to be suitably diluted with or dissolved in water and used in accordance with processes well known to the art to produce coatings on metals, as for example ferrous metals, zinc and its alloys, etc. The solutions may be used heated or unheated and there may be added to them or to the materials of the formulas, before the preparation of the coating solution, suitable quantities of modifying or accelerating agents such as metallic salts such as copper sulfate, silver nitrate, nickel dihydrogen phosphate, etc., or oxidizing agents such as nitrates, permanganates, etc., or any other useful agents known to the art, if such addition is considered desirable or necessary.

These same materials may be used alone or together with other materials known to the art in replenishing used coating solutions as well as in preparing new ones.

It may be noted that the salt or salts furnishing the inhibiting ions need not be added to the materials or concentrated solutions used in preparing the coating solutions. These may be added to the coating solution at any stage of its preparation, storage, or use, as long as sufficient of the inhibiting ion be present at the proper time to retard the loss of supersaturation of the solution to the required degree. The correct quantity of inhibiting ions which should be present depends on the severity of service. If the solution is to be maintained supersaturated at all times, it is preferable to use somewhat more of the inhibiting ion; if it is only necessary to protect the solution against "unbalance" due to occasional overheating, less is required. In general, the higher the temperature at which the effects of the inhibiting ion are to be manifested, the more is required.

In general, it may be stated that 0.02% of inhibiting ion is usually sufficient for any condition which will arise in practice.

As an example of the effectiveness of my preferred agents in inhibiting loss of supersaturation with a consequent fall in pH, certain experimental results may be cited:

In one instance a zinc phosphate solution was prepared containing 3% by volume of the solution of Formula No. 1, the balance being water. Another solution was simultaneously prepared, of identical composition, but with the omission of the ferric chloride called for in the formula.

Immediately after preparation each solution had the pH 2.38. To 500 ml. of each solution were added 8.65 ml. of 2.45 N caustic soda solution. Both solutions then had a pH of 3.33. After standing at room temperature for 24 hours, the solution free of ferric iron had fallen in pH to 3.02; the solution containing ferric iron had fallen only to pH 3.22. After 48 hours the iron-free solution had fallen to pH 3.00; the iron-containing solution only to 3.12. The pH at equilibrium of these solutions is approximately 2.95. Therefore, the presence of the inhibiting ion has notably retarded loss of supersaturation.

Further experiments have shown the following:

A zinc phosphate solution corresponding to a 5% by volume water solution of a concentrated solution similar to Formula No. 1, with the ferric chloride omitted, having a pH, as freshly made, at 75° F. of 2.30 was heated to 180° F. over a burner in about 9 minutes. The solution was then rapidly cooled to room temperature, and filtered. It then had a pH of 2.06. Further heating of the solution at 180° F. for 30 minutes lowered the pH, determined in the same way, to 2.04.

When the experiment was repeated using the same solution but with the addition of an amount of aluminum sulfate sufficient to give a concentration of aluminum ions of 0.005%, the solution fell in pH on heating to 180° F. from 2.30 only to 2.28. Further heating for 30 minutes caused a fall in pH only to 2.27.

Besides these numerical differences it was immediately apparent that the zinc phosphate solution free of aluminum had in it by the time it had been heated to 180° F. a very heavy crystalline precipitate. The solution containing the aluminum was only faintly cloudy and contained no visible crystalline precipitate even at the end of 30 minutes of heating.

In the foregoing discussion the pH's referred to are those measured by a suitable glass electrode or reference electrode such as a saturated calomel electrode.

I should like to point out that my improved stabilized phosphate coating solutions as herein described are particularly useful in connection with a process of coating in which a solution is prepared and then kept ready for use as needed. For example, in small manufacturing plants or in garages, paint shops or the like, where the parts to be treated are of considerable diversity in shape and size, and where treatment of surfaces is sporadic or occasional, or where it may be impractical to handle the work in a continuous series upon suitable conveyor equipment, my improved material provides an unusually satisfactory means for producing a phosphate coating. In such places it is customary to use portable or hand spraying equipment, and, of course, the conditions of use do not make it possible to replenish or otherwise adjust the solution with respect to its chemical content from the time that it is made up until it is completely consumed, nor is the used solution collected for reuse. It is obvious that in circumstances of this kind my improved stabilized solution is of particular value.

Another important application of my improved stabilized phosphate coating solutions as herein described is in connection with the process of producing corrosion-resistant and paint-retentive coatings on large fabricated or erected structures in situ, such as galvanized iron roofs, sidings, and signs; steel girders, as of bridges; iron and steel fences; railroad cars, etc. Such structures obviously cannot be brought to the processing tank. To coat these articles, I provide a solution which can be taken to the site of the structure and there applied without the necessity of collecting the run off for adjustment of its make-up as is now necessary with present spray processes.

Pressure spray equipment similar to that used in the spraying of paint is very satisfactory for the application of my solutions to these structures, but application of the solution by other methods is also practical.

As far as I am aware, the treatment of such structures in situ with my improved stabilized solutions is the first really practical method for "rust-proofing" such structures, the surface finish of which can be much improved and made much longer-lived if they are first so coated with a phosphate coating. This application of my invention is particularly useful in the coating of large steel or other ferrous metal surfaces.

In conclusion, I wish to point out that, although I have referred to spray processes, my invention is not to be limited to this type of process because equally good results may be obtained under some circumstances if the coating solution is merely "flowed" over the surface to be coated or where the articles are dipped into the bath.

I claim:

1. A material for preparing or replenishing an acid zinc phosphate coating solution, said material comprising zinc phosphate and a compound of a metal capable of yielding ions chosen from the group which consists of ferric, aluminum, chromic, stannous and antimonious ions, the amount of said compound being sufficient to yield in the finished solution sufficient of the said ions to substantially reduce spontaneous precipitation or crystallization of zinc phosphate from the solution and thereby retard loss of supersaturation.

2. In the art of producing substantially insoluble phosphate coatings on metal surfaces, the method which includes preparing a supersaturated acid zinc phosphate solution containing metallic ions chosen from the group which consists of ferric, aluminum, chromic, stannous and antimonious ions, the amount of said ions being sufficient to substantially reduce spontaneous precipitation or crystallization of zinc phosphate from the solution and thereby retard loss of supersaturation, and treating a metal surface with the said solution to form the desired coat.

3. A concentrated solution for use in preparing or replenishing an acid zinc phosphate coating solution, said solution comprising zinc phosphate and a compound of a metal capable of yielding ferric ions in sufficient amount in the finished solution to substantially reduce spontaneous precipitation or crystallization of zinc phosphate from the soluiton and thereby retard loss of supersaturation.

4. The method of coating metal surfaces in situ which includes preparing a supersaturated acid zinc phosphate solution containing metallic ions chosen from the group which consists of ferric, aluminum, chromic, stannous and antimonious ions, the amount of said ions being sufficient to substantially reduce spontaneous precipitation or crystallization of zinc phosphate from the solution and thereby retard loss of supersaturation, and spraying the surface with said solution.

GERALD C. ROMIG.